Nov. 20, 1928.  W. R. HESLEWOOD  1,692,301
THERMAL INDICATOR
Filed June 8, 1927
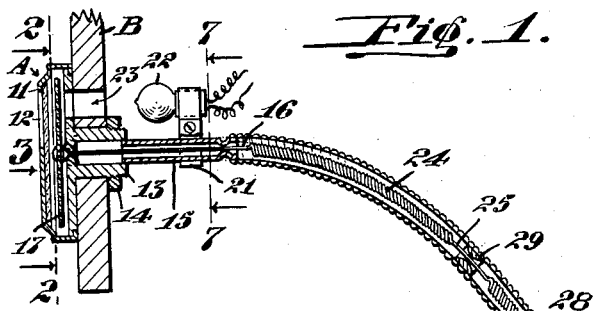
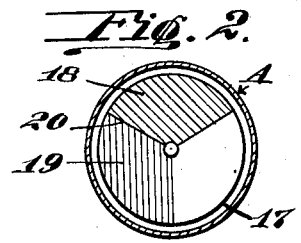
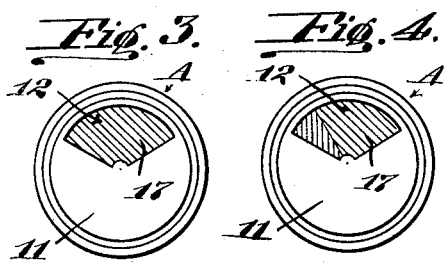
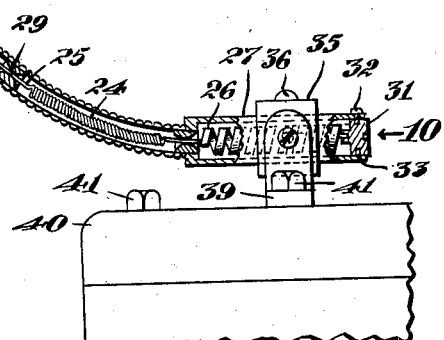
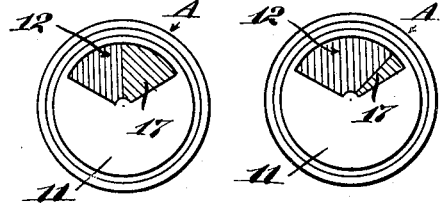
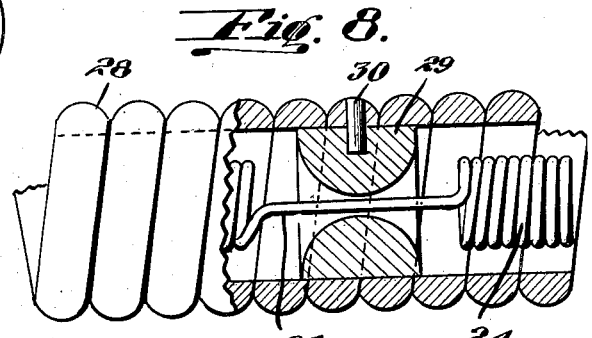
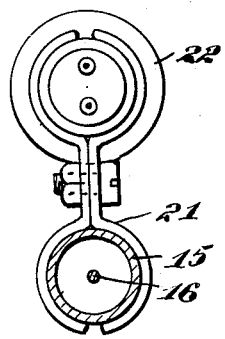
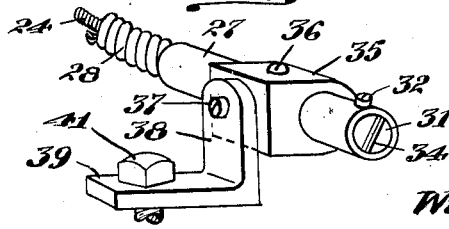
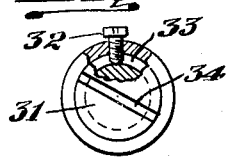
Inventor
William R. Heslewood
By R. S. Berry
Attorney Patented Nov. 20, 1928.

1,692,301

UNITED STATES PATENT OFFICE.

WILLIAM R. HESLEWOOD, OF LOS ANGELES, CALIFORNIA, ASSIGNOR OF ONE-HALF TO FRED A. DANA, OF LOS ANGELES, CALIFORNIA.

THERMAL INDICATOR.

Application filed June 8, 1927. Serial No. 197,413.

This invention relates to a construction having a very general application to meters and indicating devices, and more particularly pertains to a thermal meter which is especially applicable for use on motor vehicles for indicating to the vehicle operator the thermal condition of the water in the engine cooling system whereby excessive heating of the engine may be avoided.

An object of the invention is to provide a thermal meter embodying an indicator which may be arranged on the instrument board of a motor vehicle and be actuated by variations of temperature of the engine.

Another object is to provide a device of the above character which may be readily applied, and which is so constructed that one standard dimensioned device may be adjusted to accommodate it to varying conditions of relative arrangement of the engine and instrument board, which feature is carried out by the provision of an indicator that may be planted on the face of the instrument board, a flexible shaft leading through a small aperture in the instrument board, and a thermostat element for actuating said shaft carried on an adjustable support which may be secured to the engine head by one of the bolts of the latter.

Another object is to provide simple and convenient means for coupling the thermostat proper with the flexible shaft in such a manner that accurate adjustment may be obtained to provide for the indicator proper being properly set with relation to the thermostat to meet varying conditions.

A further object is to provide an effective means for illuminating the indicator which includes forming the indicator with a translucent dial and a lamp adapted to be arranged rearward of the instrument board so as to direct light through an aperture in said board and through the indicator in such manner as to afford a high degree of visibility.

Other objects and advantages may hereinafter appear.

Referring to the accompanying drawings which illustrate a preferred embodiment of the invention:

Fig. 1 is a vertical mid-section of the indicator showing a fragment of the instrument board upon which it is mounted. This figure shows a longitudinal section of the casing of the flexible transmission shaft and includes a view partly in section and partly in elevation of the means for adjustably supporting the thermostatic motion transmitting element upon the head of an engine block.

Fig. 2 is a front view of the indicator dial as seen on the line 2—2 of Fig. 1; red and green fields thereof being indicated by conjunctional shading. In this figure the casing for the dial is shown in section.

Fig. 3 is a view in elevation as seen in the direction of the arrow 3 of Fig. 1, showing the indicator dial in its normal position;

Fig. 4 is a face view of the casing of the indicator showing the dial as partly turned so that a portion of the red field of the dial appears through a sight opening therein;

Fig. 5 is a view similar to Fig. 4 but differs therefrom in that the dial is shown as having rotated in a clockwise direction until half of the red field of the dial is visible through the sight opening;

Fig. 6 is a view similar to Fig. 5 showing the dial as still farther rotated with the red field extended nearly opposite the sight opening in a position to indicate that the temperature acting on the thermostat is approaching the excessive degree;

Fig. 7 is a section on line 7—7 of Fig. 1 illustrating the means for illuminating the indicator;

Fig. 8 is an enlarged view partly in section and partly in side elevation of a fragment of the thermostat actuated shaft and its casing;

Fig. 9 is an enlarged perspective detail of the means for attaching the thermostat adjustably on the engine head;

Fig. 10 is an enlarged end view partly in section, as seen in the direction indicated by the arrow 10 in Fig. 1, showing the means for adjusting the thermostat with respect to the casing within which it is supported.

Referring to the drawings more specifically A indicates generally an indicator casing mounted on an instrument board B; the casing including a front wall 11 formed with a slight opening 12 here shown as in the form of a quadrant. The casing A may be secured to the instrument board B in any suitable manner but is here shown as attached by means of a nipple 13 which projects through a small aperture in the instrument board and has a nut 14 screwed thereon whereby the indicator casing is clamped in place. The nipple 13 is formed with a tubular extension 15 which projects rearwardly from the instrument board and journalled in bearings formed in the nipple and the extension is the upper end portion of a revoluble shaft 16 on the end of which is fixed a translucent dial 17 arranged in the casing and the outer face of which dial is exposed through the sight opening 12. The dial 17 is formed with a green field 18 and a red field 19 separated on a radial line 20 which fields are adapted to be exposed through the sight opening 12. Carried on the tubular extension 15 and adjustable longitudinally thereon is a bracket 21 on which is carried an electric light bulb 22 arranged rearwardly of an aperture 23 on the instrument board through which light from the bulb 22 may be directed through the translucent dial 17 opposite the sight opening 12 so as to impart great visibility to the dial.

The shaft 16 consists of a wire having a plurality of coiled sections 24 which are separated by intervening straight sections 25 relatively short in length compared to the length of the coiled sections 24, and secured to the end of the shaft opposite the dial 17 in a thermostat coil 26 arranged in a cylindrical housing 27 and operably on expansion and contraction of the coil to effect rotation of the shaft and dial. Encompassing the shaft 16 between the extension 15 and the housing 27 is a flexible tube 28 formed of a metallic spiral and arranged in the tube 28 are bushings 29 each of which consists of a ring having a convex inner margin through which is passed the intermediate straight portion 25 of the shaft 16. Each of the bushings 29 is affixed to the tube 28 by means of a pin 30 formed of soft metal; the metal being melted and poured into a socket in the bushing through a hold aligning therewith in the flexible tube as clearly indicated in Fig. 8. The bushings 29 serve as bearings for the shaft 16 and act to hold the coiled sections of the shaft out of contact with the inner surface of the tube 28 when the latter is curved as particularly shown in Fig. 1; the bushings being spaced apart such distance as to permit bending of the tube to a maximum, but preventing excessive bending such as would rupture the tube.

The thermostat coil 26 has its outer end affixed to a turnable plug 31 revolubly supported in the outer end of the casing 27; the plug being adapted to be held against turning movement by means of a set screw 32 threaded in the casing 27 having its inner end extending into an annular channel 33 formed on the outer periphery of the plug; the set screw 32 also serving to hold the plug against longitudinal movement relatively to the casing 27. The outer face of the plug 31 is formed with a kerf 34 for the reception of a screwdriver or similar tool whereby the plug may be turned to rotate the shaft 16 so as to properly position the fields 18 and 19 of the dial 17 relatively to the sight opening 12 of the indicator. The casing 27 is carried on a block 35 and is adjustable longitudinally therein; a set screw 36 threaded in the block 35 being adapted to engage the casing 27 to hold the latter against movement in its desired adjusted position. The block 35 is pivotally secured by a screw or stud 37 to the upright arm 38 of a bracket having also a horizontal portion 39 which seats on the engine head 40 and is secured in tight contact therewith by means of one of the engine bolts 41 whereby the heat of the engine will be conducted through the bracket to the thermostat to actuate the latter.

In applying the device to a motor vehicle two small apertures are formed in the instrument board B in vertical alignment, the uppermost of which constitutes the aperture 23. The thermostat housing 27 detached from the block 35 is then passed through the lowermost aperture from the outer face of the instrument board and the flexible tube is drawn through the board to bring the back wall of the casing A against the instrument board whereupon the nut 14 is passed over the tube 28 and screwed on to the nipple. The light bulb 21 is then put in position and the thermostat housing 27 is secured to the block 35. The bracket 38 is then affixed to the engine head at a convenient point. The flexible shaft and the pivotal connections between the block 35 and the bracket and between the bracket and the engine head afford means for accommodating the relative positioning of the indicator and the connection to the engine head.

Inasmuch as the device is designed to indicate when the water in the water jacket of the engine reaches a boiling point and since the temperature of the engine head may vary in different engines when the water is at boiling point, it is necessary to test the device on its initial application and to set it so that it will operate to indicate when the water reaches the boiling temperature. This is accomplished by setting the engine in operation and causing it to become heated sufficiently to boil the water. This heating of the engine causes heat to be conducted through the connections between the engine head and the thermostat housing so as to effect expansion of the thermostat element 26 and thereby cause rotation of the indicating dial 17. In event that expansion of the thermostat element under the action of the engine heat at boiling point of the water is such as not to dispose the red field 19 opposite the sight opening 12, then the plug 31 is turned to revolve the thermostat element, flexible shaft and dial to bring the red field in proper register with the sight opening, whereupon set screw 32 is tightened to hold the plug 31 against movement. After effecting this adjustment the device will function to indicate when the boiling point of the water has been reached.

While I have shown and described a specific embodiment of my invention, various changes and modifications may be made in the device without departing from the invention as set forth in the appended claims.

I claim:

1. In a thermal indicator, a thermostatic element, means for supporting said element on a heat conductive surface, a flexible shaft connected to said thermostat element; said thermostat element being operable on expansion and contraction thereof to effect rotation of said shaft, a dial fixed on said shaft having differently colored fields, a casing having a sight opening exposing a portion of said dial, means connected to said thermostat element whereby said element may be manually turned to effect adjustment of said dial relatively to the sight opening, and means for holding said last named means against rotation.

2. In a thermal indicator, a thermostatic element, a housing enclosing said element, a block in which said housing is adjustable longitudinally, a bracket carrying said block adapted to be supported on a heat conductive surface, and means actuated by said thermostat element for indicating a predetermined heat condition of the surface carrying said bracket.

3. In a thermal indicator, a thermostat element, a housing enclosing said element, a block in which said element is adjustable longitudinally, a bracket pivotally carrying said block adapted to be supported on a heat conductive surface, and means actuated by said thermostat element for indicating variations of heat condition of the surface carrying said bracket.

4. In a thermal indicator, a thermostat element, a housing enclosing said element, a bracket adapted to be supported on a heat conductive surface, means for pivotally supporting said housing on said bracket, and means actuated by said thermostat element for indicating variations of temperature of the surface carrying said bracket.

5. In a thermal indicator, a casing, means for supporting said casing on a heat conductive surface, a thermostat coil in said casing, a temperature indicator, connections between one end of said coil and said indicator, a turnable plug carried by said casing to which the other end of said coil is affixed, and means for holding said plug against movement relatively to said casing.

In testimony whereof, I have affixed my signature.

WILLIAM R. HESLEWOOD.